US012014113B2

(12) United States Patent
Kurabayashi

(10) Patent No.: US 12,014,113 B2
(45) Date of Patent: Jun. 18, 2024

(54) CONTENT PLAYBACK PROGRAM, CONTENT PLAYBACK DEVICE, CONTENT PLAYBACK METHOD, AND CONTENT PLAYBACK SYSTEM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 118 days.

(21) Appl. No.: 17/727,089

(22) Filed: Apr. 22, 2022

(65) Prior Publication Data
US 2022/0244908 A1 Aug. 4, 2022

Related U.S. Application Data

(63) Continuation of application No. PCT/JP2020/036607, filed on Sep. 28, 2020.

(30) Foreign Application Priority Data

Oct. 24, 2019 (JP) .................. 2019-193202

(51) Int. Cl.
*H04R 29/00* (2006.01)
*A63F 13/54* (2014.01)
(Continued)

(52) U.S. Cl.
CPC .............. *G06F 3/165* (2013.01); *A63F 13/54* (2014.09); *H04R 3/00* (2013.01); *H04R 29/00* (2013.01)

(58) Field of Classification Search
CPC ........ H04R 29/00; H04R 29/091; H04R 3/00; H04R 29/001
(Continued)

(56) References Cited

U.S. PATENT DOCUMENTS 7,590,249 B2 * 9/2009 Jang .................... H04S 7/30
381/61
9,842,476 B2 * 12/2017 Rihn ................... G06F 3/167
10,405,113 B2 * 9/2019 Schuster ............... H04R 3/04

FOREIGN PATENT DOCUMENTS

| JP | 2010068041 A | 3/2010 |
| JP | 6482712 B1 | 3/2019 |
| WO | 2017179539 A1 | 10/2017 |

OTHER PUBLICATIONS

International Search Report issued in International Application No. PCT/JP2020/036607, dated Dec. 1, 2020 (5 pages).
(Continued)

*Primary Examiner* — Disler Paul
(74) *Attorney, Agent, or Firm* — Osha Bergman Watanabe & Burton LLP

(57) ABSTRACT

Provided are a content playback program, a content playback device, a content playback method, and a content playback system capable of playing back sounds closer to those intended by game creators by selecting sound files, as well as settings of an equalizer, a mixer, etc., according to a sound output destination. A content playback processing unit, when started and when returned from a background state to a foreground state, checks an audio device and performs setting appropriate for the audio device. In addition, when the audio device is changed in the foreground state, the content playback processing unit also performs setting appropriate for the audio device changed to. This makes it possible to play back sounds closer to those intended by game creators according to the audio device.

6 Claims, 9 Drawing Sheets

(51) Int. Cl.
*G06F 3/16* (2006.01)
*H04R 3/00* (2006.01)
(58) Field of Classification Search
USPC .............................. 381/59, 77–81, 84–85, 74
See application file for complete search history.

(56) References Cited

OTHER PUBLICATIONS

Written Opinion issued in International Application No. PCT/JP2020/036607; dated Dec. 1, 2020 (3 pages).

* cited by examiner

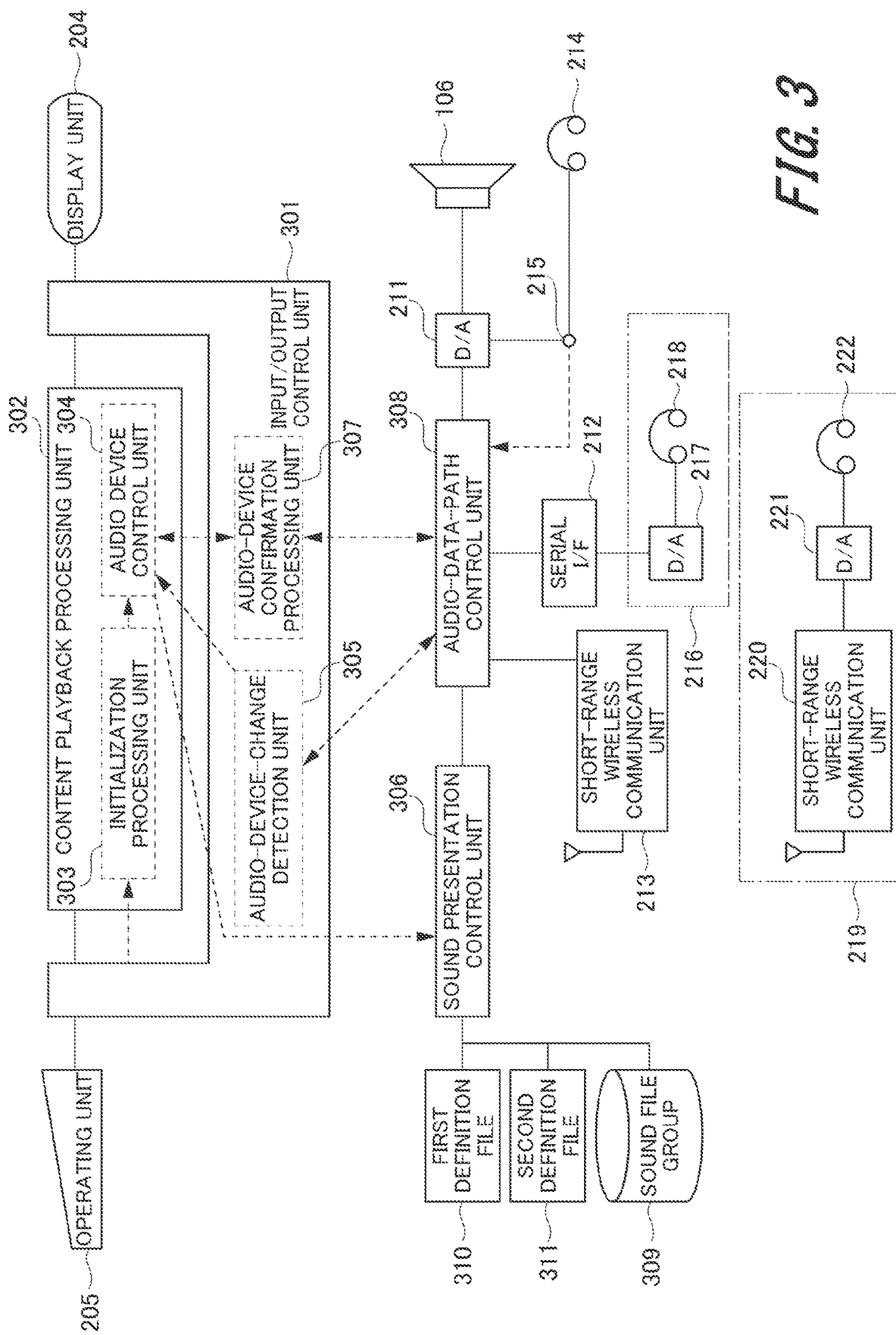

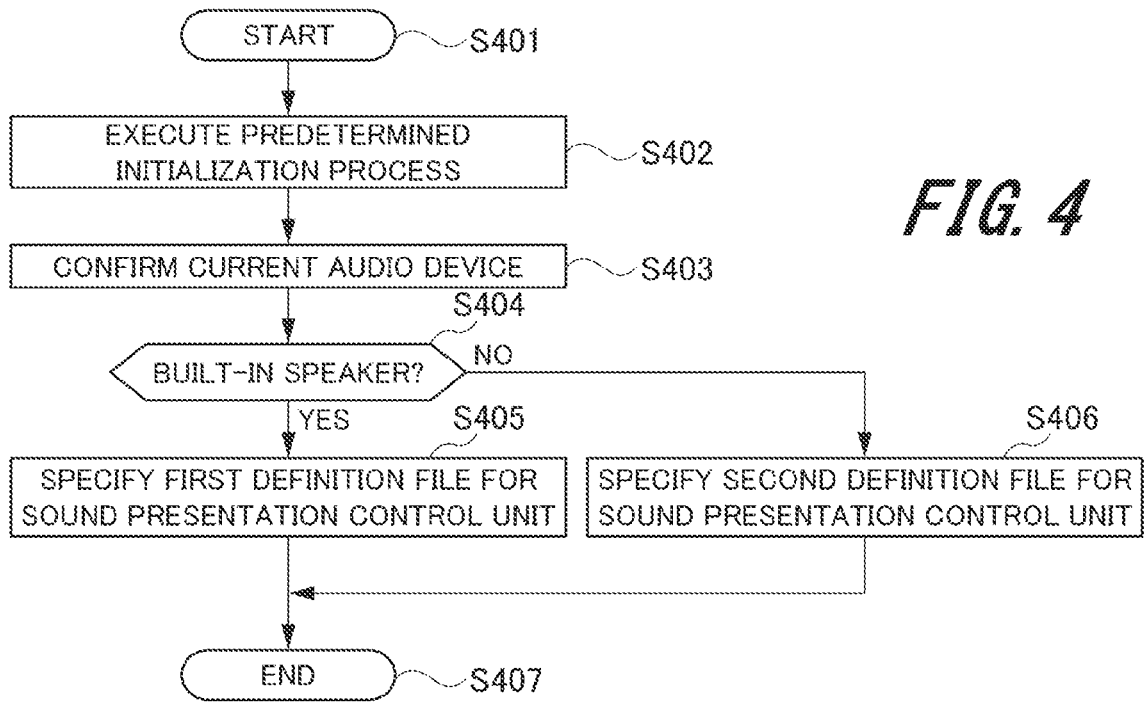
WHEN GAME IS STARTED AND WHEN RETURNED TO FOREGROUND
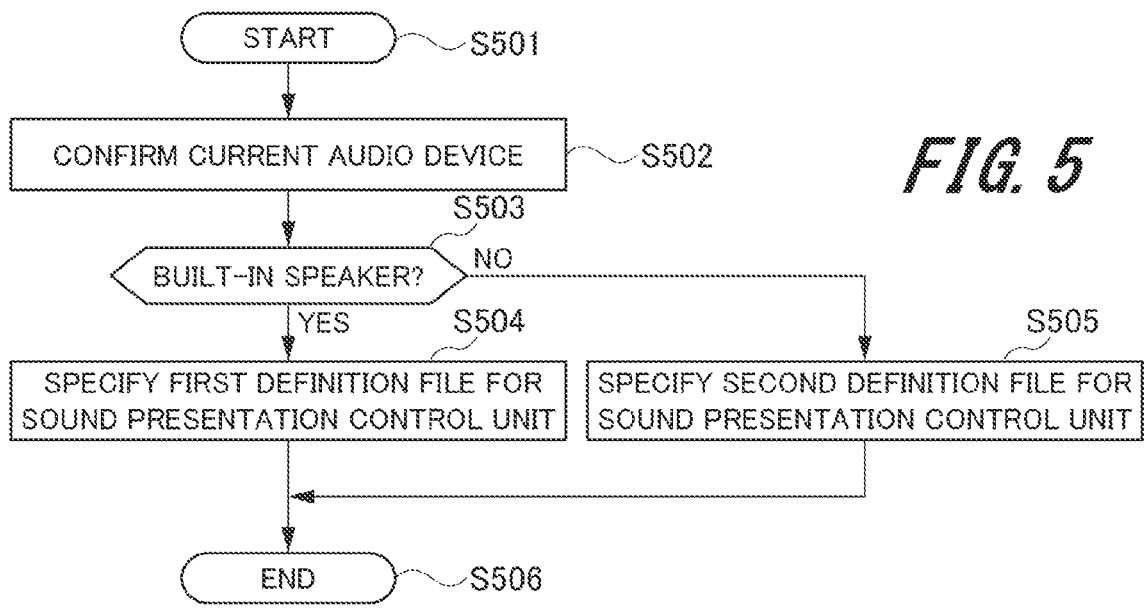
WHEN AUDIO DEVICE CHANGE TRIGGER IS DETECTED

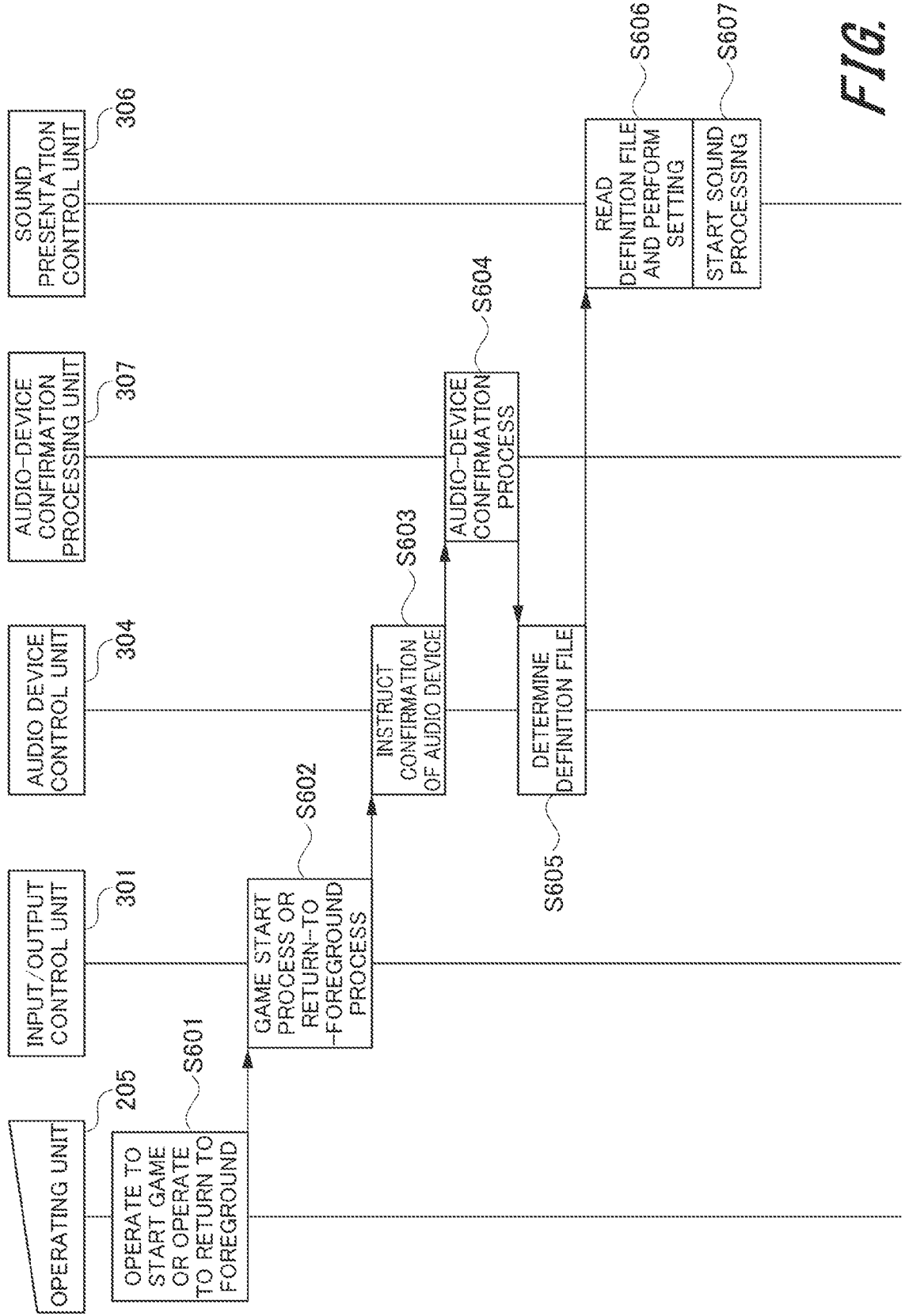

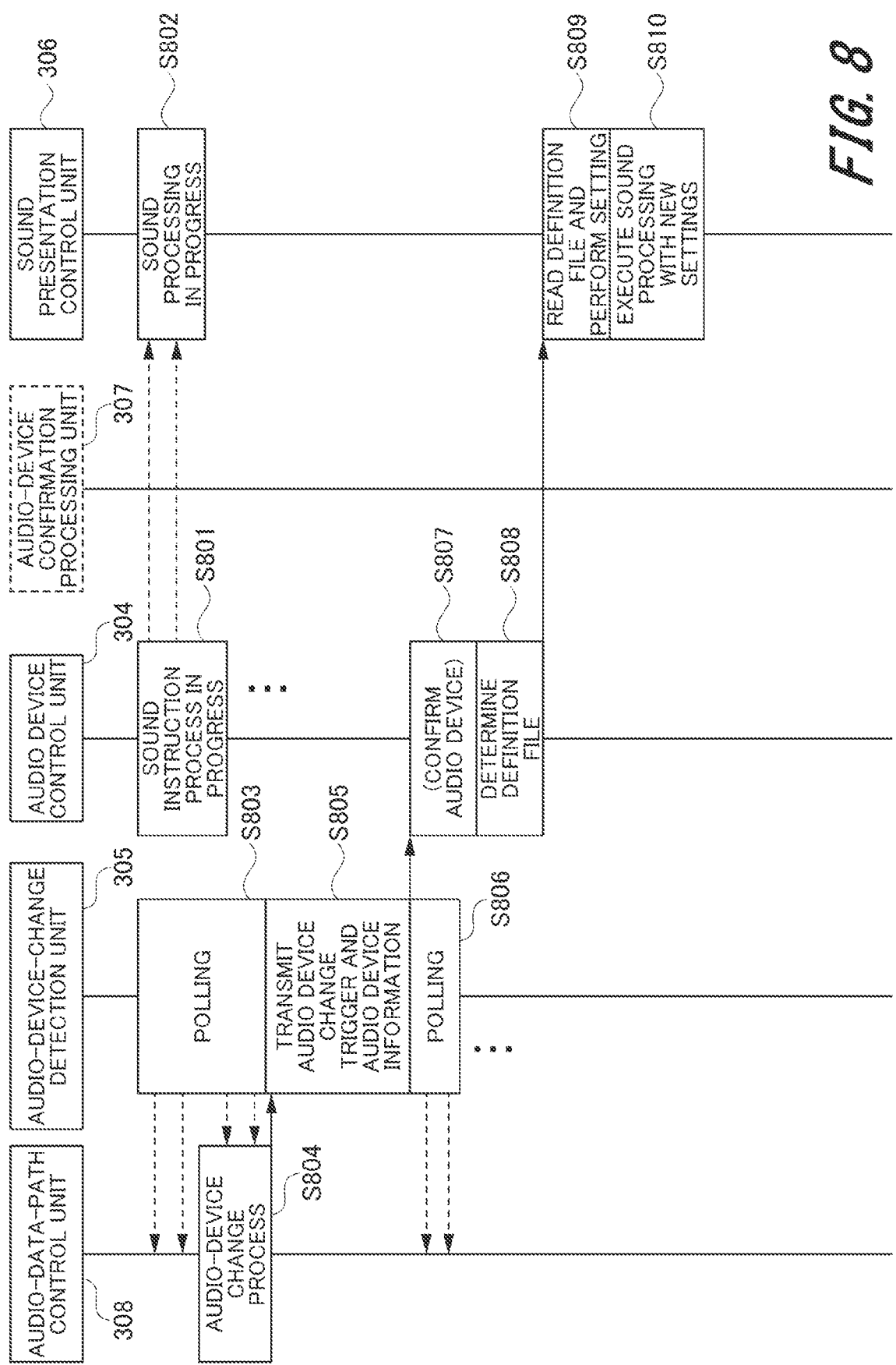

CONTENT PLAYBACK PROGRAM, CONTENT PLAYBACK DEVICE, CONTENT PLAYBACK METHOD, AND CONTENT PLAYBACK SYSTEM

TECHNICAL FIELD

The present invention relates to content playback programs, content playback devices, content playback methods, and content playback systems for making audio presentation.

BACKGROUND ART

The applicants develop and distribute game programs and game services. In recent years, there is a more growing demand for game programs or game services intended for smartphones than for game programs intended for dedicated game machines. Such a game, in an aspect, constitutes a content playback service having a composite content playback function featuring integrated elements including not only an action game element, in which game characters (hereinafter, abbreviated just as "characters") act according to user's operations, but also a novel game element, in which a story progresses through dialog among characters, and functional elements exemplified by animation images, web browsers, etc.

As such games intended for smartphones become mature, many users are beginning to recognize the "sounds" of a game, including background music (incidental music, sound tracks, etc. in other similar words) and effect sounds, as an important presentation element for drawing users into the world of the game. In addition, in response to such a demand, many game makers, including the applicants, are striving for higher quality game sounds.

PTL 1 discloses a program, an information processing device, and an information processing method capable of enhancing the efficiency in audio playback processing even in the case where the load of computational processing executed by the CPU increases as a result of audio playback objects being repeatedly generated and destroyed.

CITATION LIST

Patent Literature

{PTL 1}
Publication of Japanese Patent No. 6482712

SUMMARY OF INVENTION

Technical Problem

Today, more smartphones are used than dedicated game machines and, from the viewpoint of the market size, smartphones are becoming significantly important as a game execution platform in place of dedicated game machines. However, the built-in speakers of smartphones, which have computational capabilities comparable with those of personal computers while still attaining a small size and high density, have a small diameter, and it is hence undeniable to say that such built-in speakers have a limited playback capability compared with large-diameter speakers and headphones.

On the other hand, because smartphones have a plurality of means for allowing headphones and external audio devices to be connected thereto, users oriented towards sound quality enjoy games by voluntarily connecting headphones, etc. to smartphones. More specifically, game sounds played back with built-in speakers give considerably different impressions from those of game sounds played back with externally attached acoustic devices (External Sound Devices), such as headphones, in terms of punch and perception of realistic sounds, due to differences, etc. in the widths of a high-pitch range and a low-pitch range of playback sounds and the reproducibility of subtle nuances of sounds.

From the above, it is preferable that, in smartphones serving as a content playback platform, a sound environment suitable for built-in speakers be prepared for built-in speakers and a sound environment suitable for externally attached acoustic devices be prepared for externally attached acoustic devices.

The present invention has been conceived in light of the above-described problem, and an object thereof is to provide a content playback program, a content playback device, a content playback method, and a content playback system capable of playing back sounds closer to those intended by game creators by selecting sound files, as well as the settings of an equalizer, a mixer, etc., according to the sound output destination.

Solution to Problem

In order to solve the above-described problem, a content playback program according to the present invention causes a computer to realize: a sound presentation control function that reads at least one sound file, that decodes the at least one sound file, that performs signal processing for equalizing and mixing the at least one sound file, and that outputs an audio data stream; and an audio-data-path control function that selectively sends, to a desired audio device, the audio data stream output by the sound presentation control function.

The content playback program further causes the computer to realize: an audio-device-change detection function that detects the occurrence of a change in a connection state of the audio device; an audio-device confirmation process function that acquires, according to an inquiry request received from the outside, audio device information concerning the audio device to which the audio data stream is sent; and an audio device control function that causes the sound presentation control function to read a definition file according to the audio device information.

Advantageous Effects of Invention

The present invention can provide a content playback program, a content playback device, a content playback method, and a content playback system capable of playing back sounds closer to those intended by game creators by selecting sound files, as well as the settings of an equalizer, a mixer, etc., according to the sound output destination.

Problems, configurations, and effects other than those described above will be elucidated by explanations of the following embodiments.

BRIEF DESCRIPTION OF DRAWINGS

FIG. 3 is a block diagram showing software functions of the content playback device.

FIG. 4 is a flowchart showing the flow of processing in a content playback processing unit when a game is started and is returned to the foreground.

FIG. 5 is a flowchart showing the flow of processing in the content playback processing unit when an audio device change trigger is detected.

FIG. 6 is a timing chart showing the flow of processing in the content playback processing unit when the game is started and is returned to the foreground.

FIG. 8 is a timing chart showing the flow of processing in the content playback processing unit when the audio device is switched while the game is running on the foreground.

DESCRIPTION OF EMBODIMENTS

Figure 1:
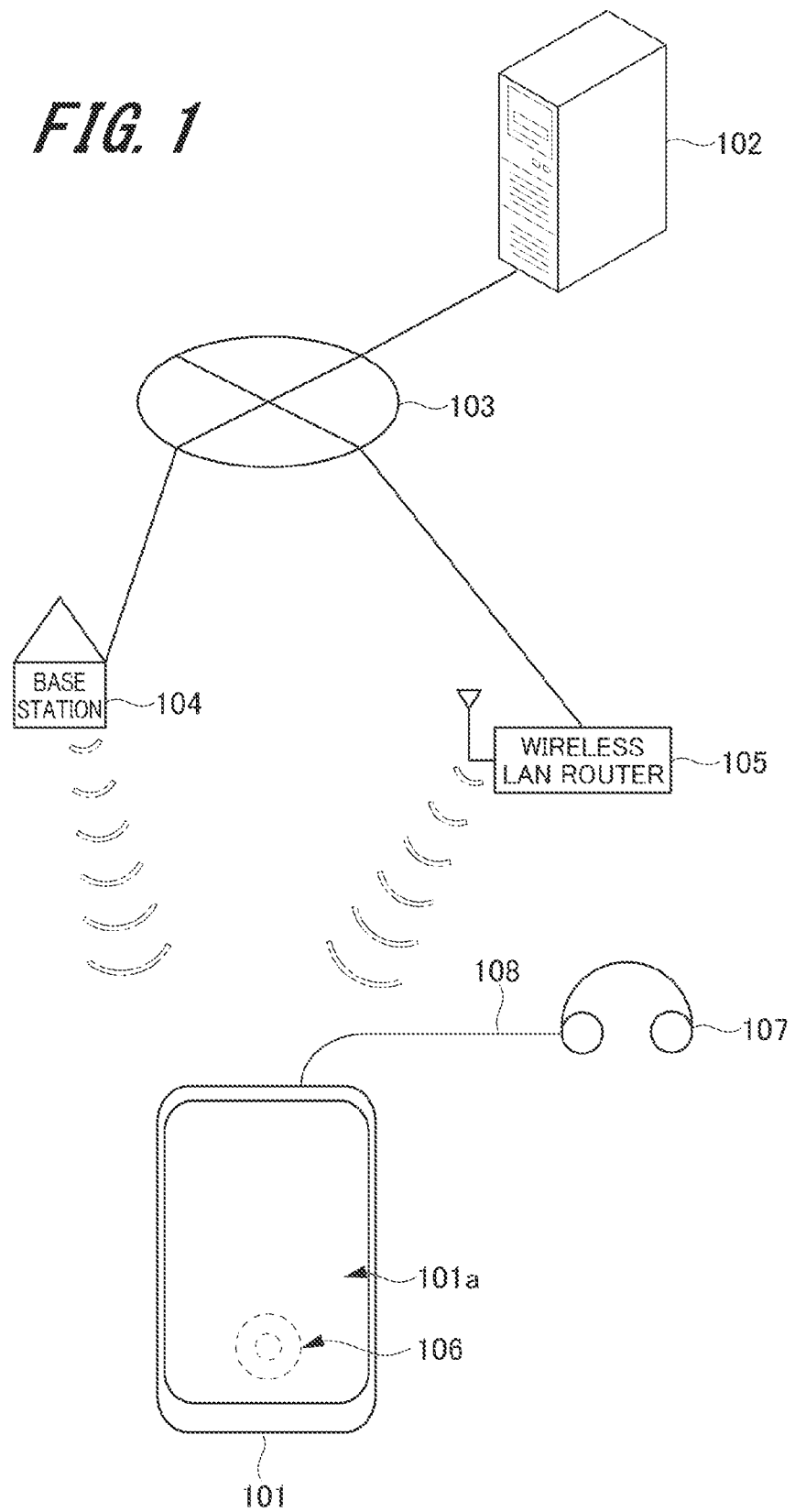
FIG. 1 is a schematic diagram showing a content playback device according to a first embodiment of the present invention and a surrounding environment.

In a game, a plurality of sound sources simultaneously make sounds, such as playing back game effect sounds and characters' voices concurrently while producing BGM. This means that sound processing in a game requires decoding a plurality of digital audio files into digital audio stream data and subjecting the digital audio stream data to equalizing and further to appropriate mixing. It takes increased time and cost to implement such complicated processing in game development. On the other hand, because sound processing is standardized processing, many game makers, including the applicants, entrust sound processing to sound middleware produced by third parties, as disclosed in PTL 1.

Conventional consumer games are produced assuming that an excellent content playback platform, such as a TV, is stationarily provided and do not assume a content playback platform for allowing a built-in speaker and an externally attached acoustic device to be selectively used, as seen specifically in terminals such as smartphones and tablet PCs. In addition, there are no games, produced for smartphones, tablet PCs, etc., that have a function for automatically selecting sound files and automatically switching the equalizer upon detecting switching between a built-in speaker and an externally attached acoustic device.

Given that, in the present invention, a game system monitors the sound playback environment (built-in speaker or externally attached acoustic device) and selects appropriate sound files and appropriate DSP settings, such as equalizer settings and mixer settings, according to the final sound output destination, thereby making it possible to play back sounds closer to those intended by the game creators.

According to the present invention, for example, equalizer settings in the case where headphones are used (e.g., settings placing emphasis on deep bass sounds) and equalizer settings in the case where a built-in speaker is used (e.g., settings placing emphasis on intermediate- and high-pitched sounds) are separately prepared. When a user uses the built-in speaker, it is possible to select sound playback equalizing that allows easy listening even under a noisy environment by emphasizing intermediate- and high-pitched sounds in the entire acoustic range. In addition, when the user uses headphones or earphones, it is possible to dynamically switch to sound playback equalizing in which deep bass sounds of BGM are emphasized.

Likewise, sound source files in the case where headphones are used (e.g., files containing deep bass sounds) and sound source files in the case where a built-in speaker is used (e.g., files in which melodies are composed of only high-pitched sounds) are separately prepared. By doing so, when the user uses the built-in speaker, it is possible to select sound files that allow easy listening even under a noisy environment by emphasizing high-pitched sounds in the entire acoustic range, as well as equalizer settings and mixer settings for emphasizing characters' voices.

First Embodiment: Content Playback Device 101: Overall Configuration

FIG. 1 is a schematic diagram showing a content playback device 101 according to a first embodiment of the present invention and a surrounding environment.

A smartphone reads a game program and functions as the content playback device 101. A user enjoys a game by operating a touchscreen display 101a of the content playback device 101.

As shown in FIG. 1, the content playback device 101 downloads a game program from a server 102 via the Internet 103, as well as a wide-area wireless communication base station 104 or a wireless LAN router 105, and executes the game program.

When executing the game program, the content playback device 101 issues sounds, such as audio and music, in the game content from a built-in speaker 106. In addition, in the case where an external audio device, such as headphones 107, a speaker, or an amplifier, is connected with a cable (wire) 108 or wirelessly, sounds are also issued from this external audio device in the same manner.

First Embodiment: Content Playback Device 101: Hardware Configuration

Figure 2:
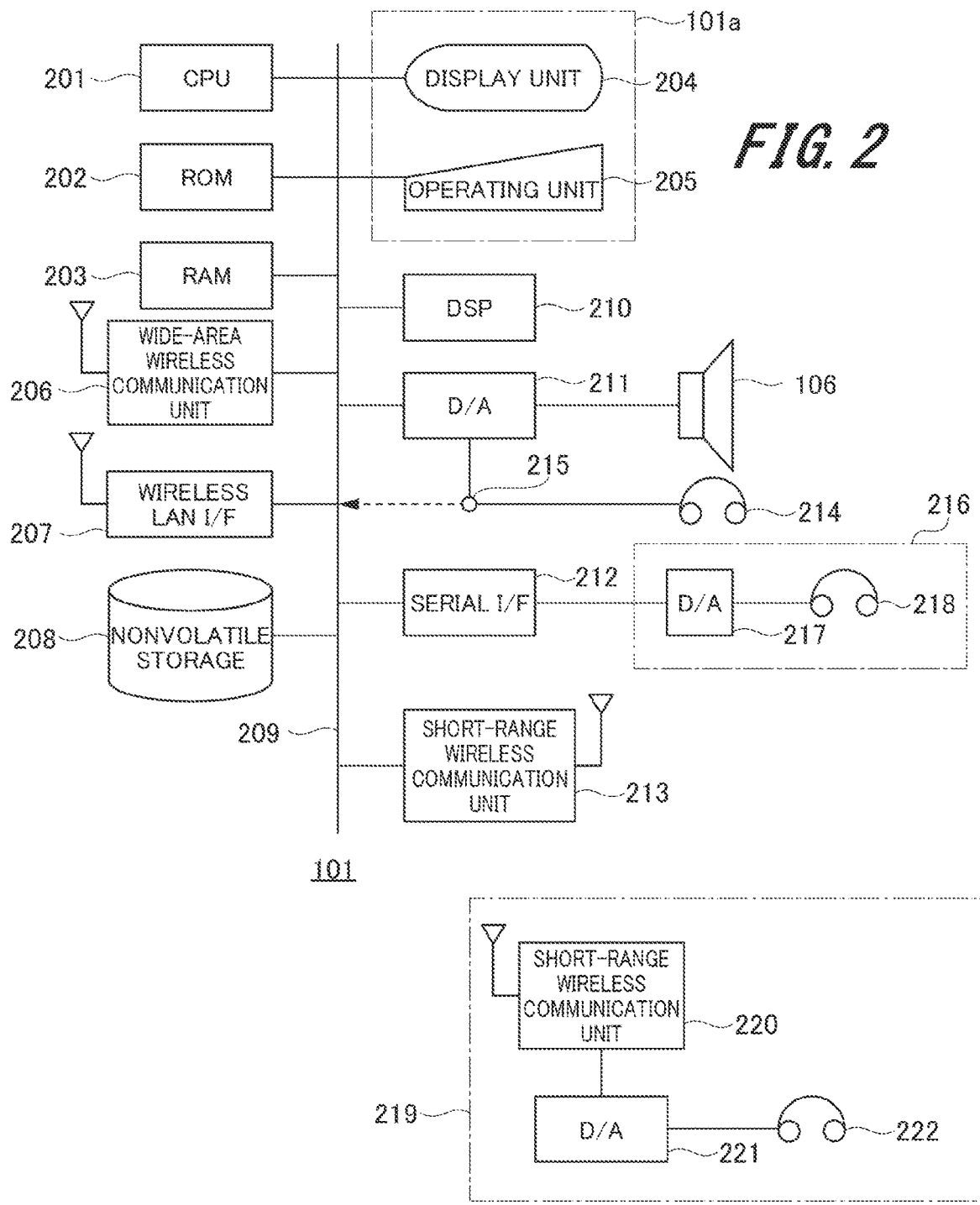
FIG. 2 is a block diagram showing the hardware configuration of the content playback device.

FIG. 2 is a block diagram showing the hardware configuration of the content playback device 101.

The content playback device 101, which is a well-known computer, includes: a CPU 201; a ROM 202; a RAM 203; a display unit 204, which is an LCD or the like; an operating unit 205, which is an electrostatic touchpanel; a wide-area wireless communication unit 206; a wireless LAN interface 207; and a nonvolatile storage 208. These unit and devices are connected to a bus 209.

Besides the above, a DSP 210, a D/A converter 211, a serial interface (hereinafter, abbreviated as a "serial I/F") 212, such as USB or Lightning®, and a short-range wireless communication unit 213, such as Bluetooth®, are connected to the bus 209.

A plurality of sound files containing game BGM, game effect sounds, characters' voices, etc. are stored in the nonvolatile storage 208. The plurality of sound files are read into the DSP 210 and/or the CPU 201 and are decoded. The decoded sound data stream is subjected to digital signal processing, such as equalizing and mixing, and is then sent to the currently active audio device.

If the currently active audio device is, for example, the built-in speaker 106, a plurality of sound files are sent to the D/A converter 211. If the currently active audio device is external analog headphones 214, a plurality of sound files are sent to the D/A converter 211, and an analog audio signal is output from an external audio terminal 215. Note that a switch (not shown in the figure) is built into the external audio terminal 215 (stereo mini-jack), so that the on/off state of this switch is detected by a program, such as the active OS, via the bus 209.

In addition, if the currently active audio device is external digital headphones 216, a plurality of sound files are sent to the serial I/F 212, which is the USB or Lighting®. The external digital headphones 216 have a D/A converter 217 built therein, and the D/A converter 217 drives a headphone unit 218.

If the currently active audio device is a short-range wireless audio device 219, such as Bluetooth® headphones or a Bluetooth® audio interface, a plurality of sound files are sent to the short-range wireless communication unit 213. The short-range wireless audio device 219 has a short-range wireless communication unit 220 and a D/A converter 221 built therein. The short-range wireless communication unit 220 demodulates digital audio data from electromagnetic waves received from the short-range wireless communication unit 213. The demodulated digital audio data is converted into an analog signal by the D/A converter 221, and the D/A converter 221 drives a headphone unit 222.

First Embodiment: Content Playback Device 101: Software Functions

FIG. 3 is a block diagram showing software functions of the content playback device 101.

An input/output control unit 301, which is the OS, interprets operation information from the operating unit 205 and passes the operation information over to a content playback processing unit 302, as required.

In addition, the input/output control unit 301 passes, over to the display unit 204, screen display data output by the content playback processing unit 302.

The input/output control unit 301 manages foreground/background execution of a plurality of application programs and gives a program a trigger indicating that the program has been specified as the foreground program when the program is specified so. Here, note that a program in the foreground state indicates an application program that is displayed on the touchscreen display and that can be operated by the user, and a program in the background state indicates an application program, other than the foreground application, that is executed concurrently with different application programs and that cannot be operated directly.

The content playback processing unit 302 is the main core of the game program.

The content playback processing unit 302 displays various types of content pieces on the display unit 204 or plays back those content pieces according to the user's operation, etc. For example, the content playback processing unit 302 displays game characters on the display unit 204 and controls the actions of those game characters on the basis of scenario data, etc., plays back moving image files, plays back sound files, and displays text data.

The content playback processing unit 302 includes an initialization processing unit 303 and an audio device control unit 304.

The initialization processing unit 303 is started in response to a trigger from the input/output control unit 301, which is the OS, when the content playback processing unit 302 is started and is returned to the foreground, and executes predetermined processing.

Upon receiving a trigger from the initialization processing unit 303 and a trigger from an audio-device-change detection unit 305, which is one of the functions of the input/output control unit 301, the audio device control unit 304 confirms the audio device and specifies a definition file suitable for a sound presentation control unit 306.

In FIG. 3, a first definition file 310 is a definition file used in the case where the currently active audio device is the built-in speaker 106. A second definition file 311 is a definition file used in the case where the currently active audio device is a device other than the built-in speaker 106.

The input/output control unit 301 includes, as some of the functions thereof, the audio-device-change detection unit 305 and an audio-device confirmation processing unit 307.

The audio-device-change detection unit 305 detects a change of the audio device by polling an audio-data-path control unit 308 and generates a trigger.

The audio-device confirmation processing unit 307 accesses the audio-data-path control unit 308 and acquires audio device information concerning the currently active audio device in response to a request for audio device information sent from the audio device control unit 304 of the content playback processing unit 302, and sends the audio device information to the audio device control unit 304, which has made the request.

The sound presentation control unit 306, which is sound middleware, reads the definition file specified by the content playback processing unit 302 and reads necessary sound files from a sound file group 309 according to a command issued from the content playback processing unit 302. Then, the sound presentation control unit 306 decodes and plays back the read sound files and performs equalizing on the sound stream data. These processes are achieved by using computational resources of the CPU 201 and the DSP 210 shown in FIG. 2. The sound presentation control unit 306 generates integrated sound stream data as a result of these computational processes.

The integrated sound stream data output by the sound presentation control unit 306 is sent to the audio-data-path control unit 308, which is one of the functions of the OS.

The audio-data-path control unit 308 selectively sends the integrated sound stream data to the currently active audio device. When no external audio devices are connected, the integrated sound stream data is sent to the built-in speaker 106 through the D/A converter 211. It should be noted, however, that in the case where mute is set by means of a function of the OS, the integrated sound stream data is not output to the built-in speaker 106.

As shown in FIG. 3, a plurality of external audio devices can be connected to the audio-data-path control unit 308.

The external analog headphones 214 are connected to the external audio terminal 215 realized by a stereo mini-jack. The integrated sound stream data output from the audio-data-path control unit 308 is sent to the D/A converter 211 and is converted into an analog audio signal. The analog audio signal output from the D/A converter 211 is output to the external analog headphones 214 through the external audio terminal 215. The external audio terminal 215 has a switch built therein, and the on/off state of this switch is perceived by the audio-data-path control unit 308.

The external digital headphones 216 are connected to the serial I/F 212. The integrated sound stream data output from the audio-data-path control unit 308 is sent to the D/A converter 217 built into the external digital headphones 216 through the serial I/F 212 and is converted into an analog audio signal. The analog audio signal output from the D/A converter 217 is output to the analog headphone unit 218.

The short-range wireless audio device 219, such as Bluetooth® headphones or a Bluetooth® audio interface, establishes bidirectional communication with the short-range wireless communication unit 213 by means of wireless communication. Thereafter, the integrated sound stream data output from the audio-data-path control unit 308 is supplied from the short-range wireless communication unit 213 to the D/A converter 221 via the short-range wireless communication unit 220 built into the short-range wireless audio device 219 and is converted into an analog audio signal by the D/A converter 221. The analog audio signal output from the D/A converter 221 is output to the analog headphone unit 222, an audio amplifier (not shown in the figure), or the like.

A smartphone OS, such as Android® or iOS®, is a multitasking OS and can execute a plurality of application programs concurrently. On the other hand, an application program that can be operated directly by the user is displayed on the touchscreen display, whereas other programs, with some exceptions, are not displayed and hence cannot be operated directly.

As already described, an application program that is displayed on the entire surface of the touchscreen display and that can be operated is referred to as an application program in the foreground state, and other application programs that are executed concurrently and that cannot be operated directly are referred to as application programs in the background state.

The content playback processing unit 302 for realizing the content playback device 101 according to an embodiment of the present invention is the main core of the game program and outputs sounds in the foreground state in which various types of operations can be performed. In the background state in which various types of operations cannot be performed, however, the content playback processing unit 302 does not basically output sounds, with some exceptions such as game programs provided with a BGM appreciation function.

In addition, the content playback processing unit 302, when started and when returned from the background state to the foreground state, is switched from a state in which no sounds are output to a state in which sounds are output. Therefore, the content playback processing unit 302 needs to confirm an audio device that executes a sound output in such a situation. Given that, when started and when returned to the foreground state, the content playback processing unit 302 checks the audio device and makes settings for the sound presentation control unit 306 by using sound files appropriate for the audio device on the basis of the definition file. In addition, when the audio device is changed in the foreground state, the content playback processing unit 302 also makes settings for the sound presentation control unit 306 by using sound files appropriate for the audio device changed to, on the basis of the definition file.

First Embodiment: Content Playback Device 101: Flow of Entire Processing

FIG. 4 is a flowchart showing the flow of processing in the content playback processing unit 302 when the game is started and is returned to the foreground.

When processing is started (S401), the content playback processing unit 302 starts the initialization processing unit 303 and executes a predetermined initialization process (S402).

Thereafter, the content playback processing unit 302 starts the audio device control unit 304 through the initialization processing unit 303.

In order to confirm the currently active audio device, the audio device control unit 304 inquires about audio device information concerning the currently active audio device from the audio-device confirmation processing unit 307 of the input/output control unit 301 (S403).

If the currently active audio device is the built-in speaker 106 as a result of the inquiry (YES in S404), the content playback processing unit 302 instructs the sound presentation control unit 306 to read the first definition file (S405).

If the currently active audio device is a device other than the built-in speaker 106 as a result of the inquiry (NO in S404), the content playback processing unit 302 instructs the sound presentation control unit 306 to read the second definition file (S406).

This is the end of a series of processing that is executed when the game is started and is returned to the foreground (S407).

FIG. 5 is a flowchart showing the flow of processing in the content playback processing unit 302 when an audio device change trigger is detected.

When the audio device control unit 304 detects a trigger issued by the audio-device-change detection unit 305 (S501), the content playback processing unit 302 starts the audio device control unit 304.

In order to confirm the currently active audio device, the audio device control unit 304 inquires about audio device information concerning the currently active audio device from the audio-device confirmation processing unit 307 of the input/output control unit 301 (S502).

If the currently active audio device is the built-in speaker 106 as a result of the inquiry (YES in S503), the content playback processing unit 302 instructs the sound presentation control unit 306 to read the first definition file (S504).

If the currently active audio device is a device other than the built-in speaker 106 as a result of the inquiry (NO in S503), the content playback processing unit 302 instructs the sound presentation control unit 306 to read the second definition file (S505).

This is the end of a series of processing that is executed when an audio device change trigger is detected (S506). The processing in steps S502 to S505 in FIG. 5 is the same as the processing in steps S403 to S406 shown in FIG. 4 that is executed when the game is started and is returned to the foreground. In other words, processing that is executed when the game is started and is returned to the foreground (FIG. 4) is the same as processing that is executed when an audio device change trigger is detected (FIG. 5), except for the initialization process shown in step S402.

FIG. 6 is a timing chart showing the flow of processing in the content playback processing unit 302 when the game is started and is returned to the foreground. This corresponds to FIG. 4. In addition, FIG. 6 includes processing that can be executed by, for example, Android® and iOS®.

When the user operates the operating unit 205 (S601), the operation information generated by the operating unit 205 results in a game start process or a return-to-foreground process by means of the input/output control unit 301, which is the OS (S602).

A trigger generated by the game start process or the return-to-foreground process in the input/output control unit 301 is sent to the content playback processing unit 302. This trigger is sent to the initialization processing unit 303 inside the content playback processing unit 302. Furthermore, this trigger is transferred from the initialization processing unit 303 to the audio device control unit 304.

Upon receiving the trigger from the input/output control unit 301 through the initialization processing unit 303, the audio device control unit 304 instructs the audio-device confirmation processing unit 307 of the input/output control unit 301 to execute an audio-device confirmation process (S603).

The audio-device confirmation processing unit 307 queries the audio-data-path control unit 308.

The audio-device confirmation processing unit 307 executes the audio-device confirmation process on the basis of audio device information acquired from the audio-data-path control unit 308 and returns audio device information indicating the currently active audio device to the audio device control unit 304 (S604).

The audio device control unit 304 determines a definition file to be used by means of the audio device information, which is a returned value reported from the audio-device confirmation processing unit 307. Then, the audio device control unit 304 instructs the sound presentation control unit 306 to read the specified definition file (S605).

The sound presentation control unit 306 reads the definition file specified by the audio device control unit 304 and executes sound file name setting, equalizer setting, mixer setting, etc. (S606). Then, the sound presentation control unit 306 starts sound processing according to a request from the audio device control unit 304 (S607).

Figure 7:
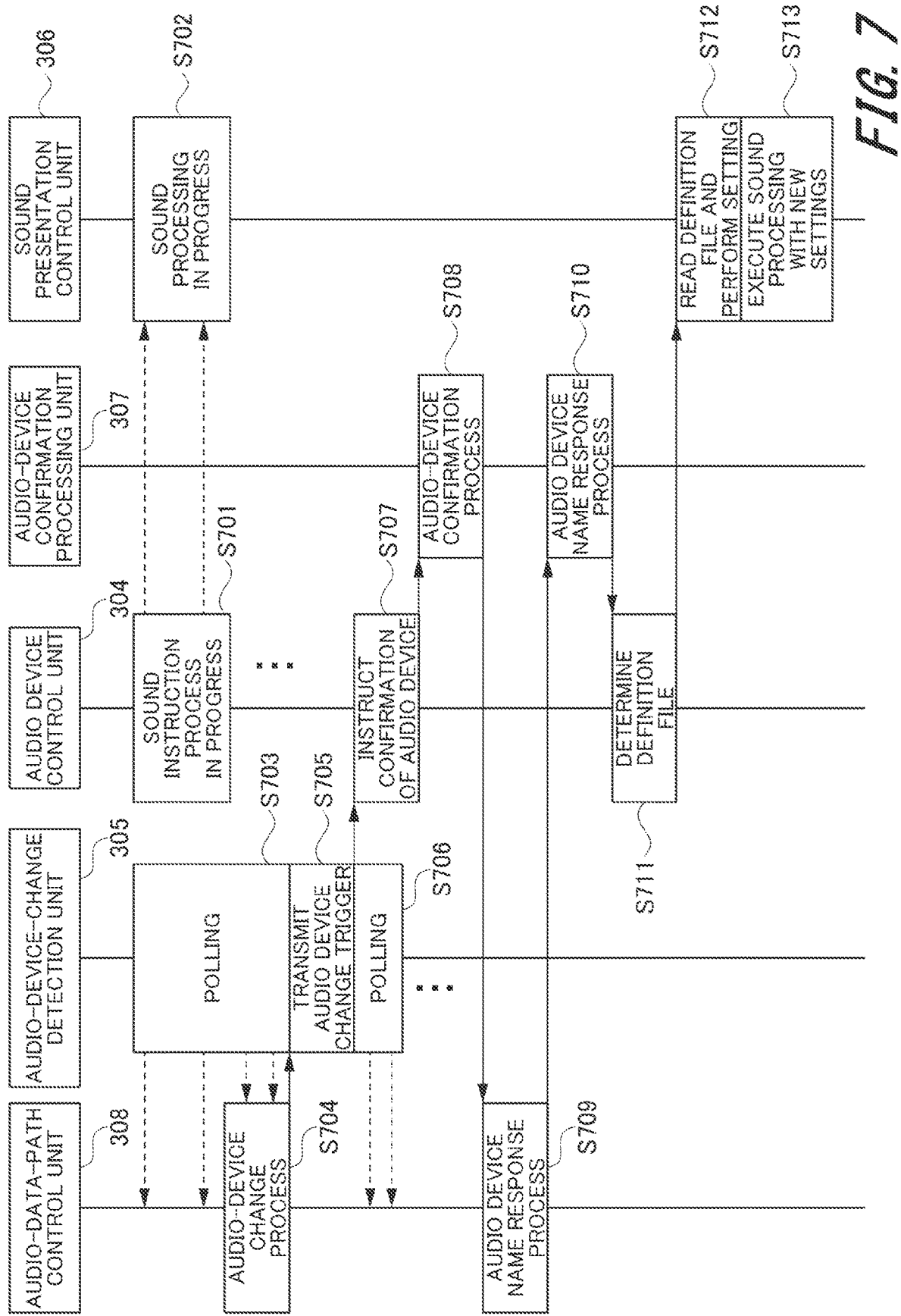
FIG. 7 is a timing chart showing the flow of processing in the content playback processing unit when an audio device is switched while the game is running on the foreground.

FIG. 7 is a timing chart showing the flow of processing in the content playback processing unit 302 when the audio device is switched while the game is running in the foreground. It should be noted, however, that FIG. 7 includes a case where the smartphone OS is, for example, Android®.

The content playback processing unit 302, which is the main core of the game program, continues to execute a content playback process. At this time, the audio device control unit 304 of the content playback processing unit 302 continues to issue a sound processing command to the sound presentation control unit 306 along with the content playback process (S701). In response to this sound processing command, the sound presentation control unit 306 continues to execute sound processing (S702).

In such a situation, the audio-device-change detection unit 305 of the input/output control unit 301 detects a change, such as attachment and detachment of an acoustic device, in a reactive manner to the audio-data-path control unit 308 (S703).

The stereo mini-plug of the analog headphones has been inserted into the stereo mini-jack.
The external digital headphones 216 have been connected to the serial I/F 212.
The short-range wireless audio device 219 has completed a pairing process.
These external audio devices have been detached.

When the audio-data-path control unit 308 executes an audio-device change process as a result of one of the above-listed operations being performed (S704), the audio-device-change detection unit 305 detects this change process and transmits an audio device change trigger to the audio device control unit 304 of the content playback processing unit 302 (S705). Thereafter, the audio-device-change detection unit 305 reactively detects a change again, such as attachment and detachment of an acoustic device (S706).

Upon receiving the trigger from the audio-device-change detection unit 305, the audio device control unit 304 of the content playback processing unit 302 instructs the audio-device confirmation processing unit 307 of the input/output control unit 301 to execute the audio-device confirmation process (S707).

The audio-device confirmation processing unit 307 queries the audio-data-path control unit 308 (S708). The audio-data-path control unit 308 responds to the audio-device confirmation processing unit 307 with an audio device name (S709).

Upon acquiring the audio device name from the audio-data-path control unit 308, the audio-device confirmation processing unit 307 returns the audio device name to the audio device control unit 304 of the content playback processing unit 302 (S710).

The audio device control unit 304 determines a definition file to be used by means of the audio device information, which is a returned value reported from the audio-device confirmation processing unit 307, and instructs the sound presentation control unit 306 to read the specified definition file (S711).

Upon reading the definition file specified by the audio device control unit 304, the sound presentation control unit 306 executes re-setting of the sound file name, equalizer, mixer, etc. (S712). When re-setting is completed, the sound presentation control unit 306 executes sound processing on the basis of the new settings (S713).

FIG. 8 is a timing chart showing the flow of processing in the content playback processing unit 302 when the audio device is switched while the game is running in the foreground. It should be noted, however, that FIG. 8 includes a case where the smartphone OS is, for example, iOS®.

The content playback processing unit 302, which is the main core of the game program, continues to execute a content playback process. At this time, the audio device control unit 304 continues to issue a sound processing command to the sound presentation control unit 306 along with the content playback process (S801). In response to this sound processing command, the sound presentation control unit 306 continues to execute sound processing (S802).

In such a situation, the audio-device-change detection unit 305 of the input/output control device 301 detects a change, such as attachment and detachment of an acoustic device, in a reactive manner to the audio-data-path control unit 308 (S803).

The stereo mini-plug of the analog headphones has been inserted into the stereo mini-jack.
The external digital headphones 216 have been connected to the serial I/F 212.
The short-range wireless audio device 219 has completed a pairing process.
These external audio devices have been detached.

When the audio-data-path control unit 308 executes an audio-device change process as a result of one of the above-listed operations being performed (S804), the audio-device-change detection unit 305 detects this change process and transmits an audio device change trigger and audio device information to the audio device control unit 304 (S805). Thereafter, the audio-device-change detection unit 305 reactively detects a change again, such as attachment and detachment of an acoustic device (S806).

Upon receiving an audio device change trigger and audio device information from the audio-device-change detection unit 305, the audio device control unit 304 of the content playback processing unit 302 determines a definition file to be used by means of the audio device information, which is a returned value reported from the audio-device-change detection unit 305 (S807), and instructs the sound presentation control unit 306 to read the specified definition file (S808).

Upon reading the definition file specified by the audio device control unit 304, the sound presentation control unit 306 executes re-setting of the sound file name, equalizer, mixer, etc. (S809). When re-setting is completed, the sound presentation control unit 306 executes sound processing on the basis of the new settings (S810).

First Embodiment: Content Playback Device 101: Example of Settings

Figure 9A:
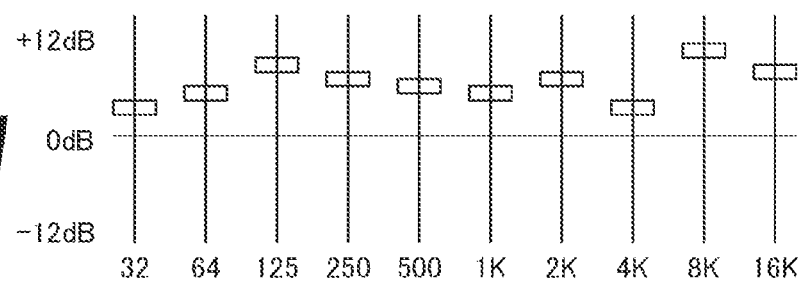
FIGS. 9A and 9B include schematic diagrams showing, in the form of a graphic equalizer, examples of equalizing settings in the cases where the audio device is an external audio device and a built-in speaker.

FIG. 9A is a schematic diagram showing, in the form of a graphic equalizer, an example of equalizing settings in the case where the audio device is an external audio device.

For example, when headphones are used, the equalizer is set with gains for emphasizing intermediate- and low-pitched sounds at about 125 Hz and emphasizing sounds over 8 kHz, as shown in FIG. 9A. These equalizer settings allow sounds from a high-pitched sound to a low-pitched sound to be produced favorably.

Figure 9B:
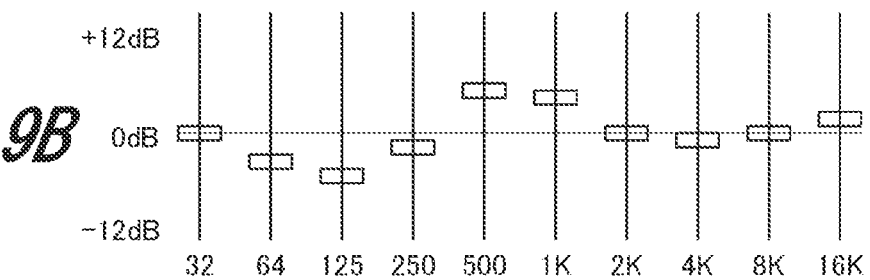

FIG. 9B is a schematic diagram showing, in the form of a graphic equalizer, an example of equalizing settings in the case where the audio device is the built-in speaker 106.

On the other hand, when the built-in speaker 106 is used, the equalizer is set with gains for emphasizing intermediate-pitched sounds at about 500 Hz and 1 kHz so as to emphasize characters' voices, as shown in FIG. 9B. These settings allow the charm of characters' voices to be faithfully reproduced even with the built-in speaker 106.

In addition, although not illustrated, it is preferable that different mixer settings be used for the case where the audio device is an external audio device and the case where the audio device is the built-in speaker 106.

In many cases, the built-in speaker 106 in the smartphone, which is a general-purpose device, has low performance, compared with special devices, such as headphones, dedicated to audio playback. For this reason, game sounds played back with the built-in speaker 106 of the smartphone give considerably different impressions from those of game sounds played back with externally attached acoustic devices, such as headphones, in terms of punch and perception of realistic sounds, due to differences, etc. in the widths of a high-pitch range and a low-pitch range of playback sounds and the reproducibility of subtle nuances of sounds.

In a battle game, there is a situation in which a plurality of characters call the name of a technique with a loud voice when they start to attack an enemy character with that technique. The main character is made to issue his/her voice loudly, while the other characters are made to issue their voices less loudly. At this time, the game can give the perception of realistic sounds by changing the volumes of voices of the other characters, according to the distances of the characters in the battle field on the game.

With the built-in speaker 106, however, not only is it difficult to reproduce this perception of realistic sounds but also it is highly likely that a character's voice is buried in another sound such as BGM if the volume of the character's voice is made too small.

For this reason, in the case where the audio device is an external audio device, the volume of a sub-character's voice is changed according to the distance of the sub-character in the battle field. On the other hand, in the case where the audio device is the built-in speaker 106, the volume of a sub-character's voice, instead of being determined according to the distance of the sub-character in the battle field, is always fixed to, for example, roughly 70% of the volume of the main character's voice.

Second Embodiment: Content Playback Device 101: Overall Configuration

For example, when the standards of the wide-area wireless communication evolve from the current 4G system to the fifth-generation mobile communication system, called 5G, it is expected that not only will the communication data volume per unit time increase but also communication delay (latency) will decrease. When such a communication environment is realized, it is likely that the game application program in the smartphone will become compact, most processes will be executed in the server 102, and the results of computation, such as screen data, will be transmitted from the server 102 to the smartphone in real-time.

In such a game environment, it will be possible to move, to the server 102, some of the functions, such as the functions of the audio device control unit 304, of the content playback device 101 according to the first embodiment of the present invention.

Figure 10:
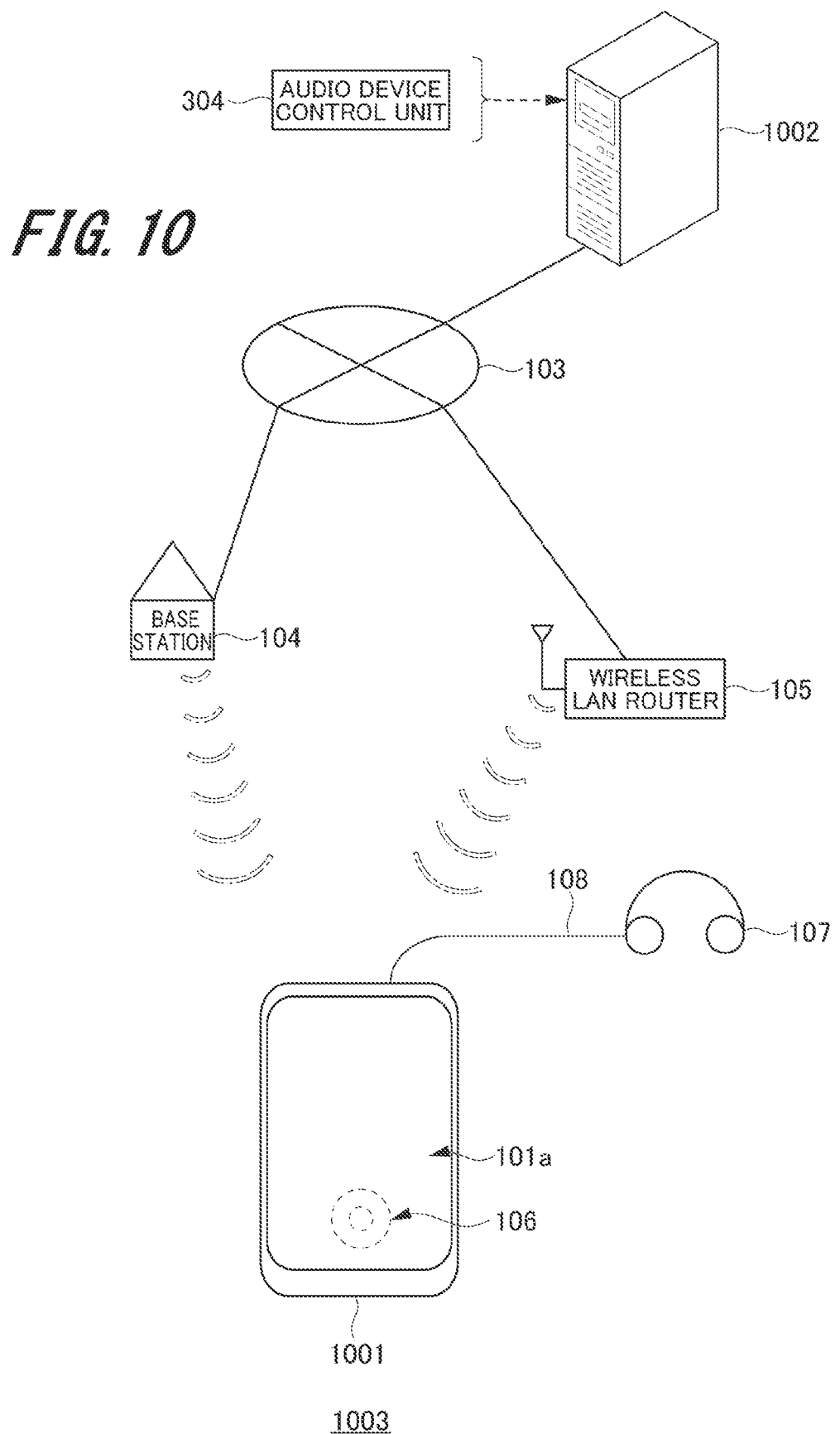
FIG. 10 is a schematic diagram showing a content playback device according to a second embodiment of the present invention and a surrounding environment.

FIG. 10 is a schematic diagram showing a content playback device 1001 according to a second embodiment of the present invention and a surrounding environment.

The smartphone functions as the content playback device 1001 by reading the game program.

The game program is downloaded from a content playback control server 1002 via the Internet 103, as well as a wide-area wireless communication base station 104 or a wireless LAN router 105, and is then executed.

The smartphone issues sounds, such as audio and music, in the game content from the built-in speaker 106. In addition, sounds are issued from external headphones in the same manner.

As shown in FIG. 10, it is assumed that the content playback control server 1002 includes the audio device control unit 304.

Upon receiving, from the content playback device 1001, a trigger indicating that the audio-device-change detection unit 305 has detected the occurrence of a change in the connection state of the audio device, the audio device control unit 304 transmits an inquiry request to the audio-device confirmation processing unit 307 of the content playback device 1001. Then, the audio device control unit 304 transmits, to the content playback device 1001, a control instruction for causing the sound presentation control unit 306 to read a definition file according to the audio device information received from the audio-device confirmation processing unit 307.

Because the audio device control unit 304 is present in the content playback control server 1002, the content playback device 1001 alone cannot completely realize a content playback function. Through communication with the content playback control server 1002, the content playback device 1001 serves as a content playback system 1003 having a content playback function.

With the above-described configuration, the content playback system 1003 is capable of producing effects similar to those produced by the content playback device 101 according to the first embodiment.

The content playback device 101 described above in the first embodiment and the content playback system 1003 described above in the second embodiment each include: the sound presentation control unit 306; the audio-data-path control unit 308; the audio-device-change detection unit 305; the audio-device confirmation processing unit 307; and the audio device control unit 304. A sound presentation control function realized by the sound presentation control unit 306, an audio-data-path control function realized by the audio-data-path control unit 308, an audio-device-change detection function realized by the audio-device-change detection unit 305, an audio-device confirmation process function realized by the audio-device confirmation processing unit 307, and an audio device control function realized by the audio device control unit 304 are realized by content playback programs constituting the content playback device 101 in a computer, such as a smartphone.

In addition, the content playback processing unit 302 realizes a content playback process function for playing back desired content, and the input/output control unit 301 realizes an input/output control function for transmitting, to the display unit, screen information generated by the content playback process function and for executing, upon receiving operation information, a start process, a stop process, a foreground execution process, and a background execution process of the content playback process function. In addition, the initialization processing unit 303 realizes an initialization process function for transmitting a trigger to the audio device control function by detecting that the input/output control function has executed the start process and/or the foreground execution process of the content playback process function.

Although the content playback device 101 and the content playback system 1003 according to the embodiments of the present invention select sound files and switch equalizer settings and mixer settings according to the audio device, the settings to be changed are not limited to those described above. For example, sound effects, such as echo, delay, and chorus, may also be changed according to the audio device.

In addition, although FIG. 3 shows the first definition file 310 used for the built-in speaker 106 and the second definition file 311 used for speakers other than the built-in speaker 106, a larger number of definition files may be provided. For example, the embodiments may be configured to prepare definition files according to the frequency characteristics of commercially available headphones and, when the device name of headphones is acquired by arbitrary means, to select an optimal definition file according to the device name.

Furthermore, although the content playback device 101 and the content playback system 1003 according to the embodiments of the present invention have been described by assuming that a smartphone is used, devices in which the present invention can be implemented are not limited to smartphones. The present invention can be implemented in portable game machines, personal computers, etc., as long as they are digital devices to which an audio playback device can be connected.

In the embodiments of the present invention, the content playback device 101 and the content playback system 1003, as well as content playback programs for realizing the content playback device 101 and the content playback system 1003, have been described.

The content playback processing unit 302 checks the audio device when it is started and when it is returned from the background state to the foreground state, thereby performing setting appropriate for the audio device. In addition, when the audio device is changed in the foreground state, the content playback processing unit 302 also performs setting appropriate for the audio device changed to. By doing so, sounds closer to those intended by the game creators can be played back according to the audio device.

Although the embodiments of the present invention have been described above, the present invention is not limited to those embodiments. The present invention includes other modifications and applications, without departing from the spirit of the present invention.

REFERENCE SIGNS LIST

101 Content playback device
101a Touchscreen display
102 Server
103 Internet
104 Base station
105 Wireless LAN router
106 Built-in speaker
107 Headphones
108 Cable
201 CPU
202 ROM
203 RAM
204 Display unit
205 Operating unit
206 Wide-area wireless communication unit
207 Wireless LAN interface
208 Nonvolatile storage
209 Bus
210 DSP
211 D/A converter
212 Serial interface
213 Short-range wireless communication unit
214 External analog headphones
215 External audio terminal
216 External digital headphones
217 D/A converter
218 Headphone unit
219 Short-range wireless audio device
220 Short-range wireless communication unit
221 D/A converter
222 Headphone unit
301 Input/output control unit
302 Content playback processing unit
303 Initialization processing unit
304 Audio device control unit
305 Audio-device-change detection unit
306 Sound presentation control unit
307 Audio-device confirmation processing unit
308 Audio-data-path control unit
309 Sound file group
310 First definition file
311 Second definition file
1001 Content playback device
1002 Content playback control server
1003 Content playback system

The invention claimed is:

1. A nontransitory computer-readable recording medium comprising a content playback program for causing a computer to perform a method comprising:

a sound presentation control function that reads at least one sound file, that decodes the at least one sound file, that performs signal processing for equalizing and mixing the at least one sound file, and that outputs an audio data stream;

an audio-data-path control function that selectively sends, to an audio device, the audio data stream output by the sound presentation control function;

an audio-device-change detection function that detects an occurrence of a change in a connection state of the audio device;

an audio-device confirmation process function that acquires, according to an inquiry request received from outside the audio-device confirmation process function, audio device information concerning the audio device to which the audio data stream is sent; and an audio device control function that:
reads, in response to determining that the audio device is currently active and a built-in speaker based on the audio device information, a first definition file tailored for the built-in speaker,
reads, in response to determining that the audio device is other than a built-in speaker based on the audio device information, a second definition file that is adjusted for an external audio device,
selects a first sound file for the audio device from a sound file group based on the first definition file or the second definition file,
wherein the first sound file is selected when a game starts, when the game returns to a foreground state, and when the audio device is changed in the foreground state, and
causes the sound presentation control function to execute the first sound file.

2. The nontransitory computer-readable recording medium according to claim 1,
wherein the audio-device-change detection function monitors the audio-data-path control function and detects the occurrence of a change in the connection state of the audio device connected to the audio-data-path control function, and
the audio device control function receives a trigger indicating that the audio-device-change detection function has detected the occurrence of a change in the connection state of the audio device, transmits an inquiry request to the audio-device confirmation process function, and causes the sound presentation control function to read a definition file according to the audio device information received from the audio-device confirmation process function.

3. The nontransitory computer-readable recording medium according to claim 2, wherein the method further comprises:
a content playback process function that plays back desired content;
an input/output control function that transmits, to a display unit, screen information generated by the content playback process function and that executes, upon receiving operation information, a start process, a stop process, a foreground execution process, and a background execution process of the content playback process function; and
an initialization process function that detects that the input/output control function has executed the start process and/or the foreground execution process of the content playback process function and that transmits a trigger to the audio device control function.

4. A content playback device comprising:
a sound presentation control unit that reads at least one sound file, that decodes the at least one sound file, that performs signal processing for equalizing and mixing the at least one sound file, and that outputs an audio data stream;
an audio-data-path control unit that selectively sends, to an audio device, the audio data stream output by the sound presentation control unit;
an audio-device-change detection unit that monitors the audio-data-path control unit and that detects an occurrence of a change in a connection state of the audio device connected to the audio-data-path control unit;
an audio-device confirmation processing unit that acquires, according to an inquiry request received from outside the audio-device confirmation processing unit, audio device information concerning the audio device connected to the audio-data-path control unit; and
an audio device control unit that:
receives a trigger indicating that the audio-device-change detection unit has detected the occurrence of a change in the connection state of the audio device,
transmits an inquiry request to the audio-device confirmation processing unit,
reads, in response to determining that the audio device is currently active and a built-in speaker based on the audio device information, a first definition file tailored for the built-in speaker,
reads, in response to determining that the audio device is other than a built-in speaker based on the audio device information, a second definition file that is adjusted for an external audio device,
selects a sound file for the audio device from a sound file group based on the first definition file or the second definition file,
wherein the sound file is selected when a game starts, when the game returns to a foreground state, and when the audio device is changed in the foreground state, and
causes the sound presentation control unit to execute the sound file.

5. A content playback method comprising:
a sound presentation step of reading at least one sound file, decoding the at least one sound file, performing signal processing for equalizing and mixing the at least one sound file, and outputting an audio data stream;
an audio-data-path control step of selectively sending, to an audio device, the audio data stream output in the sound presentation step;
an audio-device-change detection step of detecting an occurrence of a change in a connection state of the audio device;
an audio-device confirmation process step of acquiring, according to an inquiry request received from outside, audio device information concerning the audio device to which the audio data stream is sent; and
a step of receiving a trigger indicating the occurrence of a change in the connection state of the audio device and the audio device information and
a step of reading, in response to determining that the audio device is currently active and a built-in speaker based on the audio device information, a first definition file tailored for the built-in speaker,
a step of reading, in response to determining that the audio device is other than a built-in speaker based on the audio device information, a second definition file that is adjusted for an external audio device,
a step of selecting a sound file for the audio device from a sound file group based on the first definition file or the second definition file,
wherein the sound file is selected when a game starts, when the game returns to a foreground state, and when the audio device is changed in the foreground state,
a step of executing the sound presentation step by using the sound file.

6. A content playback system comprising:
a content playback device; and
a content playback control server for controlling the content playback device,
wherein the content playback device comprises:
a sound presentation control unit that reads at least one sound file, that decodes the at least one sound file, that performs signal processing for equalizing and mixing the at least one sound file, and that outputs an audio data stream, an audio-data-path control unit that selectively sends, to an audio device, the audio data stream output by the sound presentation control unit, an audio-device-change detection unit that monitors the audio-data-path control unit and that detects an occurrence of a change in a connection state of the audio device connected to the audio-data-path control unit, and an audio-device confirmation processing unit that acquires, according to an inquiry request received from outside the content playback device, audio device information concerning the audio device connected to the audio-data-path control unit, and the content playback control server comprises an audio device control unit that:

receives, from the content playback device, a trigger indicating that the audio-device-change detection unit has detected the occurrence of a change in the connection state of the audio device, transmits an inquiry request to the audio-device confirmation processing unit of the content playback device, reads, in response to determining that the audio device is currently active and a built-in speaker based on the audio device information, a first definition file tailored for the built-in speaker, reads, in response to determining that the audio device is other than a built-in speaker based on the audio device information, a second definition file that is adjusted for an external audio device, selects a sound file for the audio device from a sound file group based on the first definition file or the second definition file, wherein the sound file is selected when a game starts, when the game returns to a foreground state, and when the audio device is changed in the foreground state, and causes the sound presentation control unit to execute the sound file.

\* \* \* \* \*